(12) United States Patent
Kaji et al.

(10) Patent No.: US 8,743,101 B2
(45) Date of Patent: Jun. 3, 2014

(54) DISPLAY DEVICE FOR MEASURING DISPLAY CHARACTERISTICS ASSOCIATED WITH DISPLAY OF DISPLAY PANEL

(75) Inventors: Eiichi Kaji, Hakusan (JP); Takahiro Kono, Hakusan (JP)

(73) Assignee: EIZO Corporation, Hakusan-Shi (JP)

( * ) Notice: Subject to any disclaimer, the term of this patent is extended or adjusted under 35 U.S.C. 154(b) by 133 days.

(21) Appl. No.: 13/390,645

(22) PCT Filed: Jun. 21, 2010

(86) PCT No.: PCT/JP2010/060484
§ 371 (c)(1),
(2), (4) Date: Feb. 15, 2012

(87) PCT Pub. No.: WO2011/024546
PCT Pub. Date: Mar. 3, 2011

(65) Prior Publication Data
US 2012/0146973 A1     Jun. 14, 2012

(30) Foreign Application Priority Data
Aug. 27, 2009  (JP) .................................. 2009-197227

(51) Int. Cl.
*G06F 3/038*   (2013.01)

(52) U.S. Cl.
USPC ........................................................ 345/207

(58) Field of Classification Search
CPC ................................... G06F 3/38; G09G 5/00
USPC .................... 345/204, 207, 690, 697; 349/58; 250/205, 216
See application file for complete search history.

(56) References Cited

U.S. PATENT DOCUMENTS

| | | | |
|---|---|---|---|
| 8,378,577 B2* | 2/2013 | Lai ................................. | 315/149 |
| 2002/0030660 A1* | 3/2002 | Arakawa ........................ | 345/102 |
| 2003/0006980 A1* | 1/2003 | Brabander et al. ............. | 345/207 |
| 2005/0083323 A1* | 4/2005 | Suzuki et al. .................. | 345/207 |
| 2007/0146357 A1* | 6/2007 | Hsu ................................ | 345/207 |
| 2007/0222741 A1 | 9/2007 | Itaya | |
| 2008/0204437 A1* | 8/2008 | Jensen ........................... | 345/207 |

FOREIGN PATENT DOCUMENTS

| | | |
|---|---|---|
| JP | 7-29526 | 6/1995 |
| JP | 10-096890 | 4/1998 |
| JP | 2005-070131 | 3/2005 |

(Continued)

OTHER PUBLICATIONS

International Search Report issued in International Application No. PCT/JP2010/060484 on Sep. 28, 2010.

*Primary Examiner* — Pegeman Karimi
(74) *Attorney, Agent, or Firm* — Stein IP, LLC (57) ABSTRACT

The present invention relates to a display device that measures display characteristics (such as luminance or chromaticity) associated with a display panel. The display device of the present invention has a light sensor (5) provided at a position allowing outgoing light from a screen (1a) of a liquid crystal panel (1), which serves as the display panel, and extraneous light reflected on the screen (1a) to enter the light sensor (5). Since the light sensor (5) is provided at the position, it is possible to measure the characteristics of the display panel and also the characteristics of the extraneous ambient light reflected on the screen. Thus, it is possible to accurately adjust the display characteristics based on the measurement results.

7 Claims, 8 Drawing Sheets

(56) References Cited

FOREIGN PATENT DOCUMENTS

| JP | 2005-128089 | 5/2005 |
| JP | 2007-256405 | 10/2007 |
| JP | 2009-139648 | 6/2009 |
| JP | 2010-169990 | 8/2010 |

* cited by examiner

DISPLAY DEVICE FOR MEASURING DISPLAY CHARACTERISTICS ASSOCIATED WITH DISPLAY OF DISPLAY PANEL

CROSS-REFERENCE TO RELATED APPLICATIONS

This application is a National Phase of PCT International Patent Application No. PCT/JP2010/060484, filed Jun. 21, 2010, which claims priority to Japanese Patent Application No. JP 2009-197227, filed Aug. 27, 2009, in the Japanese Patent Office, the disclosures of which are incorporated herein by reference.

BACKGROUND OF THE INVENTION

1. Field of the Invention

The present invention relates to a display device, which has a display panel, such as a liquid crystal panel, a PDP (Plasma Display Panel) or an organic EL (Electro-Luminescence), and which measures display characteristics (such as luminance or chromaticity) associated with display of the display panel.

2. Background Art

For example, a liquid crystal display device having a liquid crystal panel controls the transmittance amount of light from a backlight, which is provided on the back side thereof, by changing the light transmittance ratio of each pixel of the liquid crystal panel. Thus, the liquid crystal display device displays tone of the image. The light transmittance ratio of the liquid crystal panel may become off the designed values due to the manufacturing variations of the liquid crystal panel, and thereby the desired tone characteristics may not be obtained. For the countermeasure for the above, a memory may store an LUT (lookup table), which is associated with a tone level (tone value) based on a received image signal and an input level to the liquid crystal panel corresponding to the tone level. Then, the tone level is converted into the input level based on the LUT for correcting the unique tone characteristics of each display device in order to achieve desired tone characteristics.

Figure 10A:
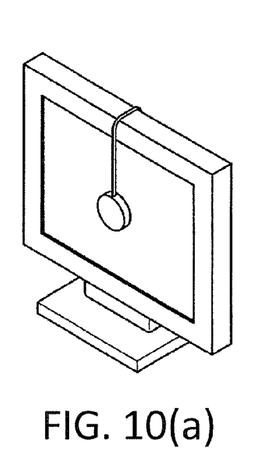
FIGS. 10(a) to 10(c) are schematic diagrams for explaining methods for measuring display characteristics in a conventional display device.
Figure 10B:
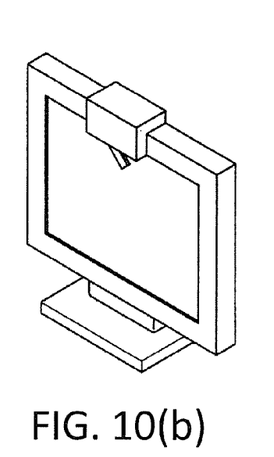
Figure 10C:
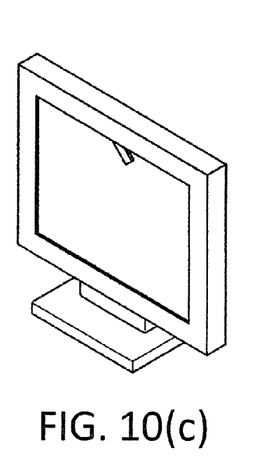

However, characteristics of the liquid crystal panel and the backlight may change across the ages during the usage of the display device. When the aging occurs, it may be impossible to achieve the desired tone characteristics even after the correction of the tone characteristics based on the LUT stored during the production or the shipping of the display device. It is possible to deal with the above problem if the user updates the LUT (or performs the calibration) after the shipping of the display device. Since it is necessary to measure the actual display characteristics of the display device during the execution of the calibration, the display device is provided with a sensor for the measurement. FIGS. 10(a) to 10(c) are schematic diagrams for explaining methods for measuring the display characteristics in conventional display devices.

For example, a conventional display device is configured to have a light sensor provided in the vicinity of the backlight within the display device, and is configured to execute the calibration based on the luminance of the backlight measured by the light sensor (not shown in FIGS. 10(a) to 10(c)). However, the light sensor of the display device is only capable of measuring characteristics of the backlight, and thereby it is disadvantageously not possible to execute the calibration in consideration of the characteristics of the liquid crystal panel.

Also, for example, another display device is configured to have a separate light sensor used for measuring the display characteristics (see FIG. 10(a)). When the display device is used for the measurement, the user is required to connect the light sensor with the display device through a cable and the like, and to attach the light sensor to a suitable position (such as a center position) on the screen of the liquid crystal panel. In this configuration with the separate light sensor, since it is possible to measure the display characteristics based on the image displayed on the liquid crystal panel, it is advantageously possible to measure the display characteristics for not only the backlight, but also for the liquid crystal panel. However, it is a problem that the user himself/herself has to take time to install the light sensor for the calibration. Also, since the center of the screen is covered by the light sensor, there is another problem that the user is incapable of using the display device during the measurement of the display characteristics.

Also, for example, there is still another display device that has a movable light sensor (hereinafter referred to as a swing sensor) (see FIG. 10(b)). The swing sensor is attached to a framing member that surrounds the liquid crystal panel, and is extendable over the screen by a motor, an actuator, or the like. Furthermore, there is further another display device configured to have a swing sensor that is built in the framing member of the display device (see FIG. 10(c)). The above display devices are advantageously capable of measuring the display characteristics of the backlight and the liquid crystal panel, and allow the user to operate the display devices with the swing sensor mounted thereon. Since the display devices are configured such that the light sensor is movable to cover the peripheral part of the screen only when the display characteristics are measured, it is possible to solve the problem of taking time for the measurement of the display characteristics. Also, the user is allowed to use the display device even when the display characteristics are measured since the light sensor is configured to cover only a part of the peripheral part of the screen.

Also, Patent Document 1 proposes a liquid crystal display device that has a detecting pattern drawn in an invisible area of liquid crystal display plate, and a light detection sensor is provided at the pattern position. The light detection sensor detects transmitted light from a backlight, which is provided at a back side of the liquid crystal display plate, and automatically controls bias voltage, which is sent to an image control unit of the liquid crystal display plate to maximize the contrast of the detecting pattern. As a result, the liquid crystal display device is capable of reliably and automatically adjusting the contrast of the liquid crystal display plate regardless of the particular difference of various characteristics of each product.

Patent Document 2 proposes a display device that is provided with a light sensor having a light receiving surface. The light receiving surface is tilted relative to a light guiding hole, which is formed at a side of a reflecting plate that reflects light of a backlight, and to a front face of the display device by a predetermined angle such that the light receiving surface receives light through the light guiding hole and extraneous light from the exterior of the device. The display device is configured to switch the luminance of the backlight based on the light receiving results of the light sensor. Thus, the display device is capable of preventing frequent switching of the luminance of the backlight due to a slight change of the extraneous light.

PRIOR ART REFERENCE

Patent Document

Patent Document 1: Japanese Unexamined Utility Model Application Publication No. Hei7-29526

Patent Document 2: Japanese Unexamined Patent Application Publication No. Hei10-96890

SUMMARY OF THE INVENTION

However, the conventional display devices shown in FIGS. 10(a) to 10(c) only consider characteristics associated with light from the backlight passed through the liquid crystal panel, which the light sensor is capable of measuring. When the display characteristics of the display device are to be adjusted, it is preferable to perform the adjustment in consideration of light (ambient light) associated with the usage environment of the display device in addition to the characteristics of the backlight and the liquid crystal panel. Adjustment of the display characteristics in consideration of the ambient light enables the display device to display the images more suitable for the usage environment of the display device by the user and the work environment of the user.

Due to the above, the conventional display devices shown in FIGS. 10(a) to 10(c) may be provided with an additional light sensor for measuring the ambient light. However, the additionally provided light sensor is capable of measuring only natural ambient light, such as luminosity around the display device. Ambient light useful for the adjustment of the display characteristics is a light component that is reflected on the screen of the liquid crystal panel, and thereby it is required to perform the adjustment of the display characteristics by measuring the reflected light of the ambient light. In the conventional display device, since the light sensor, which measures the characteristics of the liquid crystal panel and the backlight, covers the screen during the measurement, the light sensor is incapable of measuring the characteristics of the ambient light reflected on the screen. Even when the additional light sensor is employed, the additional light sensor is incapable of measuring the characteristics of ambient light reflected on the screen.

Also, in the liquid crystal display device described in the Patent Document 1, since the invisible area of the liquid crystal display plate, in which the detecting pattern is drawn, is not exposed to the exterior, the invisible area will not reflect ambient light, and thereby it is impossible to measure reflected light of ambient light by using the light detection sensor. Since the display device described in the Patent Document 2 is configured to directly detect light from the backlight and light from the exterior by using the light sensor, the display device is incapable of measuring the display characteristics in consideration of the liquid crystal panel, and thereby is incapable of measuring the reflected light of ambient light on the screen.

The present invention is made in view of the above, and thereby the objective of the present invention is to provide a display device that is capable of measuring the characteristics of the display panel (such as a liquid crystal panel) as well as the characteristics of extraneous ambient light reflected on the screen of the panel.

A display device according to the present invention has a display panel that displays an image, and a light sensor provided outside a screen of the display panel. The light sensor is provided at a position allowing outgoing light from the screen of the display panel and extraneous light reflected on the screen to enter the light sensor.

Also, in the display device according to the present invention, the light sensor is provided at the position preventing the extraneous light from directly entering the light sensor.

Also, the display device according to the present invention further includes a framing member provided to surround the display panel and a recess formed at an inner surface of the framing member. The light sensor is provided within the recess.

Also, in the display device according to the present invention, the light sensor has a light receiving surface that receives light, and the light receiving surface is provided in the recess such that the light receiving surface faces the screen of the display panel in a manner, where the light receiving surface is tilted relative to the screen by a predetermined angle.

Also, the display device according to the present invention further includes a light shielding means for preventing extraneous light from directly entering into the recess.

Also, the display device according to the present invention further includes a light guiding means for guiding, to the light sensor, the outgoing light from the screen and the light reflected on the screen. The light guiding means is provided outside the screen of the display panel.

Also, in the display device according to the present invention, the light guiding means includes a light collecting portion and a light shielding portion, which together form a step shape. The light collecting portion faces the screen of the display panel to receive the outgoing light from the screen and the light reflected on the screen. The light shielding portion faces away from the screen of the display panel to prevent extraneous light.

Also, in the display device according to the present invention, the light guiding means is an optical member that reflects, to the light sensor, the outgoing light from the screen and the light reflected on the screen.

In the present invention, a light sensor is provided outside a screen of a display panel (such as a liquid crystal panel) for measurement. Due to the configuration, since there is no need to attach the light sensor to the display device for the measurement of the display characteristics, it is possible to resolve the trouble of the user, and also the light sensor does not cover the display region.

Also, the light sensor is provided at a position allowing outgoing light from the screen of the display panel and extraneous light (ambient light) reflected on the screen to enter the light sensor. Due to the above, the light sensor is capable of receiving light necessary for the adjustment of the display characteristics, and of measuring its characteristics. Thus, the display device is capable of adjusting the display characteristics based on the characteristics of the display panel itself and based on the characteristics of reflected light of the extraneous light, which may influence the display.

Also in the present invention, the light sensor is provided at a position preventing extraneous light from directly entering into the light sensor. Due to the above, the light sensor receives only the outgoing light from the screen and the extraneous light reflected on the screen, and thereby it is possible to prevent the deterioration of the accuracy in the measuring of the display characteristics caused by receiving the extra extraneous light.

Also, in the present invention, a recess is formed on an inner surface of a framing member that is provided to surround the display panel, and the light sensor is provided within the recess to perform the measurement. Light from a peripheral part of the screen of the display panel tends to enter into the recess formed within the inner surface of the framing member, and by appropriately providing the light sensor within the recess, it is possible to receive and measure, by using the light sensor, outgoing light from the peripheral part of the screen and extraneous light reflected on the peripheral part. As a result, it is possible to prevent the extraneous light from being received directly by the light sensor.

Also, in the present invention, the light sensor is provided within the recess such that a light receiving surface of the light sensor is tilted relative to the screen of the display panel by a predetermined angle. As a result, it is possible to provide the light sensor such that the outgoing light from the screen and the extraneous light reflected on the screen enter into the light receiving surface of the light sensor and such that the extraneous light does not directly enter into the light receiving surface.

Also, in the present invention, there is provided a means for preventing extraneous light from directly entering into the recess. For example, a part of an opening part of the recess formed at the framing member is covered by a light shielding plate so as to prevent the extraneous light from directly entering thereto. Due to the above, it is possible to reliably remove the influence of direct extraneous light from the characteristics measured by the light sensor, and thereby it is possible to more accurately perform the measurement.

Also, in the present invention, the display device is provided with a light guiding means for guiding, to the light sensor, outgoing light from the screen of the display panel and extraneous light reflected on the screen. Due to the above, it is possible to improve the flexibility of the arrangement position of the light sensor in the display device. Also, since the light guiding means is provided outside the screen of the display panel (for example, is provided to the framing member), the light guiding means does not cover the screen, and thereby does not interfere with the usage of the display device by the user.

Also, in the present invention, the light guiding means includes a light collecting portion, which faces the screen of the display panel, and a light shielding portion, which faces away therefrom. Outgoing light from the screen of the display panel and extraneous light reflected on the screen enter the light collecting portion that faces the screen, and are guided to the light sensor. Extraneous light, which comes from a position other than the screen, and which directly enters into the light guiding means, is prevented by the light shielding portion of the light guiding means, and thereby is not guided to the light sensor. Due to the above, it is possible to reliably perform the measurement using the light sensor.

Also, in the present invention, the light guiding means is configured to reflect light to guide the light to the light sensor. By appropriately arranging the light guiding means, it is possible to guide, to the light sensor, outgoing light from the screen of the display panel and extraneous light reflected on the screen, and thereby it is possible to improve the flexibility of the position, at which the light sensor is arranged.

According to the present invention, a light sensor is provided outside a screen of a display panel, and is configured to measure outgoing light from the screen of the display panel and extraneous light (ambient light) reflected on the screen. Thus, it is possible to achieve the measurement of the display characteristics not only based on the characteristics of the display panel, but also based on a surrounding environment of the display device. As a result, it is possible to contribute the improvement of display quality of the display device.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

(First Embodiment)

Figure 1:
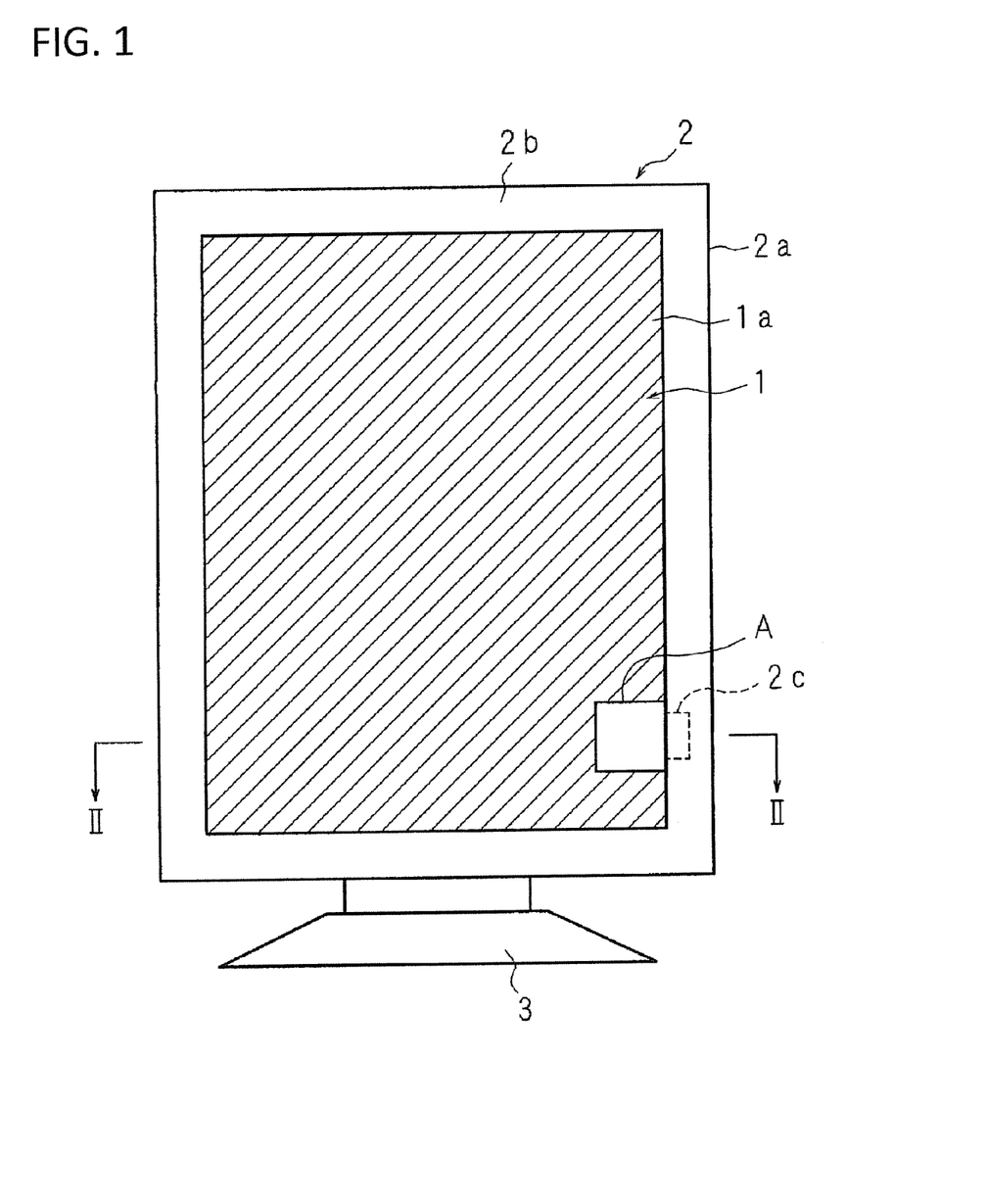
FIG. 1 is a front view illustrating an appearance of a display device according to the present invention.
Figure 2A:
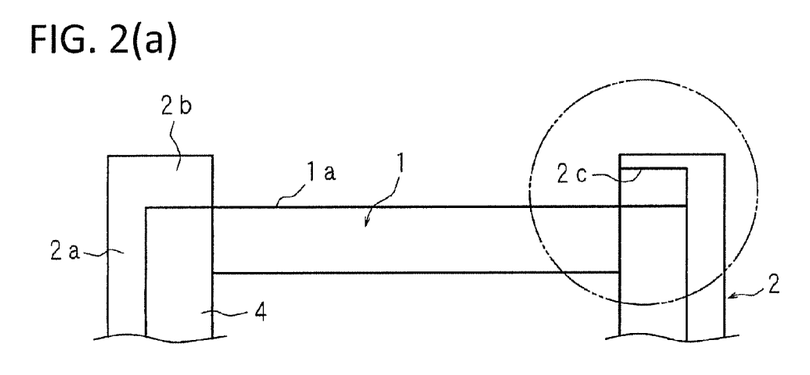
FIGS. 2(a) and 2(b) are schematic cross-sectional views illustrating configurations of a display device according to the first embodiment of the present invention.
Figure 2B:
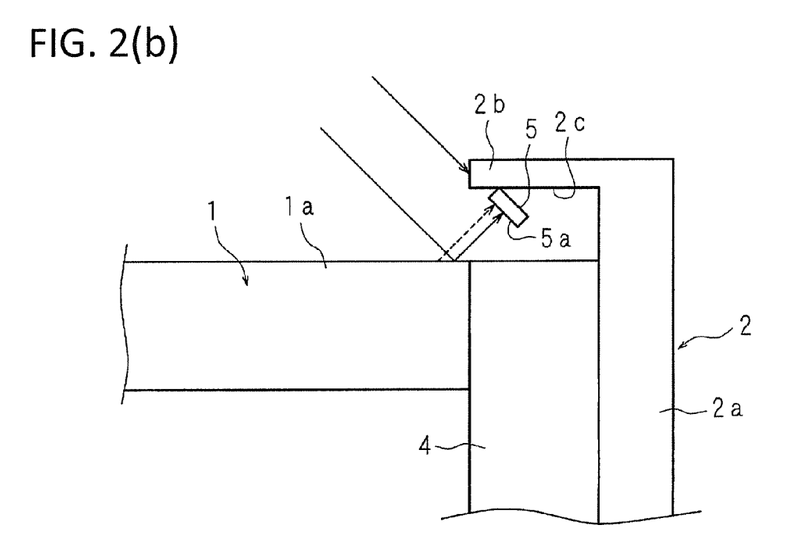

Hereinafter, the present invention is specifically described with reference to drawings that illustrate the embodiment. FIG. 1 is a front view illustrating an appearance of a display device according to the present invention, and FIGS. 2(a) and (b) are schematic cross-sectional views illustrating the configuration of a display device according to the first embodiment of the present invention. FIGS. 2(a) and 2(b) illustrate cross sections taken along a line II-II shown in FIG. 1, and FIG. 2(b) is an enlarged view of an encircled part of a dashed and double-dotted line in FIG. 2(a).

The display device shown is a liquid crystal display device that includes a liquid crystal panel 1 as a display panel. The display device has a main body part, which has a generally rectangular plate shape, and is provided with a rectangular screen 1a of the liquid crystal panel 1 at the front (front surface) of the main body part. The screen 1a is capable of displaying various images, and is supported by a stand 3, which is fixed at the back of the main body part of the display device, such that the screen 1a stands generally perpendicularly to a desk surface, a floor surface, or the like.

The main body part of the display device has a synthetic resin or metal casing that receives therein the liquid crystal panel 1, a backlight and circuit boards (not shown). The casing of the display device is dividable into multiple components, and these components include a framing member 2 that serves as a front side of the display device. The framing member 2 has a rectangular frame shape having a generally rectangular opening, and is provided to surround the liquid crystal panel 1 such that the screen 1a is visible through the opening. In FIGS. 2(a) and 2(b), although there is nothing provided at the opening of the framing member 2, the framing member 2 may be configured to have a light transparent material, which covers the opening of the framing member 2, for dust proofing.

The casing of the display device receives therein a metal or synthetic resin chassis 4, and the chassis 4 receives therein the liquid crystal panel 1 and the backlight. The chassis 4 has a generally rectangular flat container shape that is smaller than the casing of the display device. The liquid crystal panel 1 is received in the chassis 4 and fixed thereto immovably such that the screen 1a is visible through the opening on the front side. The chassis 4 receives therein the backlight that is aligned on the back side of the liquid crystal panel 1. The backlight may include a CCFL (Cold Cathode Fluorescent Lamp) or LEDs (Light Emitting Diode). Also, the chassis 4 receives therein an optical member that reflects or spreads the light from the backlight in order to emit the light toward the back of the liquid crystal panel 1.

The framing member 2, which constitutes the casing of the display device, includes a side wall portion 2a and a front frame portion 2b. The side wall portion 2a has a rectangular tubular shape and surrounds a side surface of the chassis 4, and the front frame portion 2b has a rectangular frame shape and covers a peripheral part of the front side of the chassis 4. The front frame portion 2b of the framing member 2 has the opening that is generally as large as the opening of the chassis 4. Although the front frame portion 2b covers the front of the chassis 4, the front frame portion 2b does not cover the screen 1a of the liquid crystal panel 1 that is fixed to and received in the chassis 4. In a state where the chassis 4 is received in the casing of the display device, the front frame portion 2b of the framing member 2 projects forward (toward the front side) from the screen 1a of the liquid crystal panel 1 that is fixed to and received in the chassis 4.

The front frame portion 2b of the framing member 2 has an inner surface, on which a recess 2c is formed at a lower-right position in a front view. The recess 2c is configured to open at an inner surface side and a back side of the front frame portion 2b, and to be closed at a front side, an outer surface side, and upper and lower sides of the front frame portion 2b. In a case where the chassis 4 is received within the casing of the display device, the back side of the recess 2c is closed by the front peripheral part of the chassis 4. In FIGS. 2(a) and 2(b), although the recess 2c is configured to open at the inner surface side of the front frame portion 2b, the opening of the recess 2c may be alternatively configured to be closed by a light transparent material for dust proofing.

A light sensor 5 is provided in the recess 2c. The light sensor 5 has a polyhedron shape, which has a light receiving surface 5a at one of the surfaces thereof. The light sensor 5 is a sensor element, which measures characteristics (for example, luminance) of light that is received by the light receiving surface 5a, and which outputs electric signals based on the measurement results. Also, the light sensor 5 is provided within the recess 2c in a state where the light receiving surface 5a is tilted relative to the screen 1a of the liquid crystal panel 1 by a predetermined angle (for example, 45°), so that the light receiving surface 5a faces the screen 1a. Note that the predetermined angle, by which the light sensor 5 is tilted relative to the screen 1a, may be determined as required based on a view angle of the liquid crystal panel 1, a size of the recess 2c, a size of the light sensor 5, etc.

Since the light receiving surface 5a of the light sensor 5 is designed to face the screen 1a of the liquid crystal panel 1 in a tilted state within the recess 2c, the light sensor 5 is capable of receiving light outgoing from the screen 1a of the liquid crystal panel 1 (see the dashed line arrow in FIG. 2(b)) by using the light receiving surface 5a. The light sensor 5 is also capable of receiving reflected light, which is the light from the exterior of the display device reflected on the screen 1a of the liquid crystal panel 1 (see the solid line arrow in FIG. 2(b)). In practice, the outgoing light from the screen 1a of the liquid crystal panel 1 is the light, which is emitted by the backlight of the display device, and which transmits through the liquid crystal panel 1. Also, the light from the exterior of the display device may be sunlight or may be luminous light of a room, in which the display device is installed.

Also, since the light sensor 5 is provided within the recess 2c of the framing member 2 and since the light receiving surface 5a is tilted to face the screen 1a of the liquid crystal panel 1, light from the exterior of the display device does not directly enter the light receiving surface 5a of the light sensor 5 (or, light from the exterior does not enter the light receiving surface 5a without being reflected on the screen 1a). Even in a case where extraneous light enters the light receiving surface 5a, the amount of the entering extraneous light is sufficiently small compared with light from the liquid crystal panel 1 and light reflected on the screen 1a. As a result, the light sensor 5 does not directly receive the extraneous light, but is capable of receiving the outgoing light from the liquid crystal panel 1 and the extraneous light reflected on the screen 1a.

Figure 3:
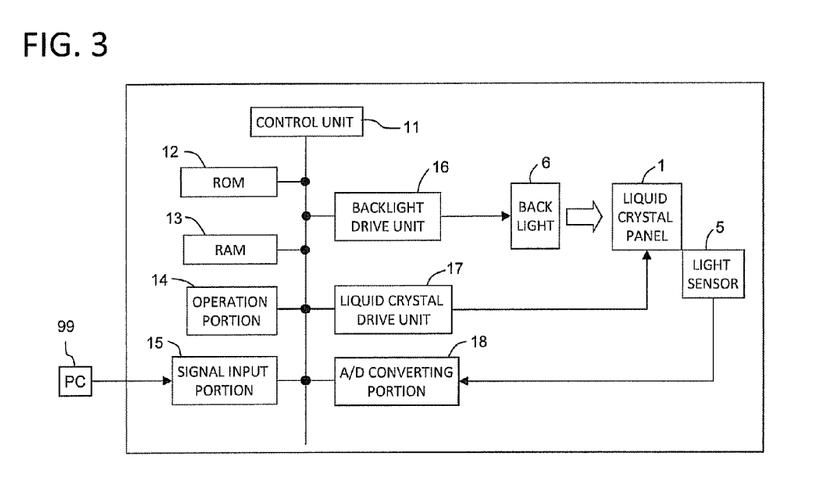
FIG. 3 is a block diagram illustrating a configuration of the display device according to the present invention.

FIG. 3 is a block diagram illustrating a configuration of the display device according to the present invention. The display device of the present embodiment is configured to include, in addition to the above liquid crystal panel 1, the light sensor 5 and the backlight 6, a control unit 11, ROM (Read Only Memory) 12, a RAM (Random Access Memory) 13, an operation portion 14, a signal input portion 15, a backlight drive unit 16, a liquid crystal drive unit 17, and an A/D converting portion 18. In FIG. 3, the display device is connected to a computer, such as a PC (Personal Computer) 99, and the display device is configured to display images based on image signals received from the PC 99. However, the configuration of the display device is not limited to the above.

The control unit 11 may, specifically, include a calculation process apparatus, such as a CPU (Central Processing Unit) or an MPU (Micro Processing Unit), and is connected to each part within the display device through a bus. The control unit 11 controls the operation of these parts to execute various processes (for example, displaying images on the liquid crystal panel 1). The ROM (Read Only Memory) 12 includes a nonvolatile memory element, such as an EEPROM (Electrically Erasable Programmable ROM) or a flash memory, and pre-stores programs, data and the like necessary for the operation of the control unit 11. The RAM 13 includes a data rewritable memory element, such as an SRAM (Static RAM) or a DRAM (Dynamic RAM). For example, the control unit 11 performs processes by executing the programs stored in the ROM 12, and stores, in the RAM 13, data generated during the computation in the processes.

The operation portion 14 has various function keys for the operation of the display device. For example, the operation portion 14 is provided with setting keys for setting the display characteristics of the display device, such as a key for changing luminosity (brightness), by which images are displayed on the liquid crystal panel 1, or another key for changing a color balance of the displayed image. The operation portion 14 receives the user operation on the function keys, and informs the control unit 11 of the user operation such that the control unit 11 controls the operation of each component based on the information from the operation portion 14.

The signal input portion 15 includes a connection terminal that is connected with external equipment (such as the PC 99) through a signal cable, and obtains image signals received from the PC 99. The image signals are sent to the liquid crystal drive unit 17 after going through various image processing by the control unit 11, such as luminosity adjustment or color balance adjustment. Then, the liquid crystal drive unit 17 drives the liquid crystal panel 1 based on the given image signals such that the display device is capable of displaying the images based on the image signals from the PC 99. The image signals, which are inputted into the signal input portion 15 from the PC 99, may be either analog signals or digital signals.

The liquid crystal panel 1 has a structure, in which a pair of glass substrates face with each other, and in which a liquid crystal layer serving as a liquid crystal substance is formed between the glass substrates. One of the glass substrates is provided with multiple pixel electrodes and TFTs (Thin Film Transistor), each drain of which is connected to each of the pixel electrodes. The other one of the glass substrates is provided with a common electrode. A gate and a source of each TFT are connected to a gate driver and a source driver (not shown) of the liquid crystal drive unit 17, and respectively receive drive signals from the liquid crystal drive unit 17.

The liquid crystal drive unit 17 outputs a drive signal for driving the liquid crystal panel 1 based on the given image signals. More specifically, the gate driver of the liquid crystal drive unit 17 selectively applies the voltage based on the given image signals to the gates of a number of TFTs of the liquid crystal panel 1, and similarly, the source driver of the liquid crystal drive unit 17 applies, to the sources of the TFTs, the voltage of a voltage value corresponding to the inputted video signals. Due to the above, in the liquid crystal panel 1, on/off of the TFT of each pixel is controlled based on the voltage applied from the gate driver of the liquid crystal drive unit 17. Also, the light transmittance ratio, which is determined based on the electro-optical characteristics of the liquid crystal substance, is controlled by applying the output voltage, which is inputted from the source driver of the liquid crystal drive unit 17, to the TFT of each pixel (or by applying an input level for the liquid crystal panel 1 to the TFT of each pixel). Thus, it is possible to adjust the transmittance of light from the backlight 6, and thereby to display the tones for the desired image.

In the chassis 4 of display device, the backlight 6 is provided at the back side of the liquid crystal panel 1. The backlight 6 is driven based on the output voltage given by the backlight drive unit 16. The backlight drive unit 16 adjusts the output voltage to the backlight 6 based on the operation of the control unit 11. Due to the above, for example, it is possible to cause the backlight drive unit 16 to adjust the output voltage, and thereby to adjust the luminance of the backlight 6 in accordance with brightness setting, which the user has set by using of the operation portion 14.

The light sensor 5, which is provided within the recess 2c formed at the framing member 2 of the display device, has a phototransistor. The light sensor 5 outputs signals of voltage based on the intensity or the quantity of light received by the light receiving surface 5a. Analog signals outputted by the light sensor 5 are fed into the A/D converting portion 18 of the display device, and are converted into digital signals by the A/D converting portion 18. Then, the converted signals are given to the control unit 11.

As above, the display device drives the liquid crystal panel 1 and the backlight 6 based on the image signals inputted by the PC 99. As a result, the display device is capable of displaying images on the screen 1a of the liquid crystal panel 1 in accordance with the image signals. In the above process, the control unit 11 of the display device converts the tone values of the image signals, which are inputted into the signal input portion 15 from the PC 99, into tone values (drive amount of the TFT) that are optimum for the display on the liquid crystal panel 1, and gives the converted values to the liquid crystal drive unit 17. In the process, the control unit 11 uses a conversion table (not shown) pre-stored in the ROM 12. The conversion table has tone values of input image signals and the associated tone values of image signals given to the liquid crystal drive unit 17. Optimum values are stored during the designing phase or the production process of the display device in order to achieve the ideal display characteristics.

However, when the display characteristics of the liquid crystal panel 1 slightly changes due to the aging of the liquid crystal panel 1 after the continuous usage of the display device, the display device may be incapable of displaying the images having the ideal display characteristics on the liquid crystal panel 1 even if the tone values are converted based on the pre-stored conversion table. Also, because of the aging of the backlight 6, the maximum light emitting quantity may deteriorate and the toning may change. Also, the liquid crystal panel 1 and the backlight 6 may not be able to display the images with the ideal display characteristics due to the so-called variation with time of the display characteristics during the period from immediately after the turning on of the display device to the time when the display characteristics is stabilized. Thus, the display device is designed to be able to correct the drive amount of the liquid crystal panel 1 and the backlight 6. This correcting process may be executed based on the user operation through the operation portion 14, or alternatively, may be automatically executed by a predetermined cycle.

When the display device executes the correcting process, the display device firstly measures the display characteristics of the screen 1a of the liquid crystal panel 1 (the characteristics of the light outgoing from the screen 1a and the light reflected on the screen 1a) by using the light sensor 5. Then, the display device changes the drive amount of the liquid crystal panel 1 and the backlight 6 in order to cancel the difference between the ideal characteristics of the display device and the measured display characteristics. The ideal characteristics of the display device may be pre-stored in the ROM 12, or may be calculated based on the image signals from the PC 99.

Figure 4:
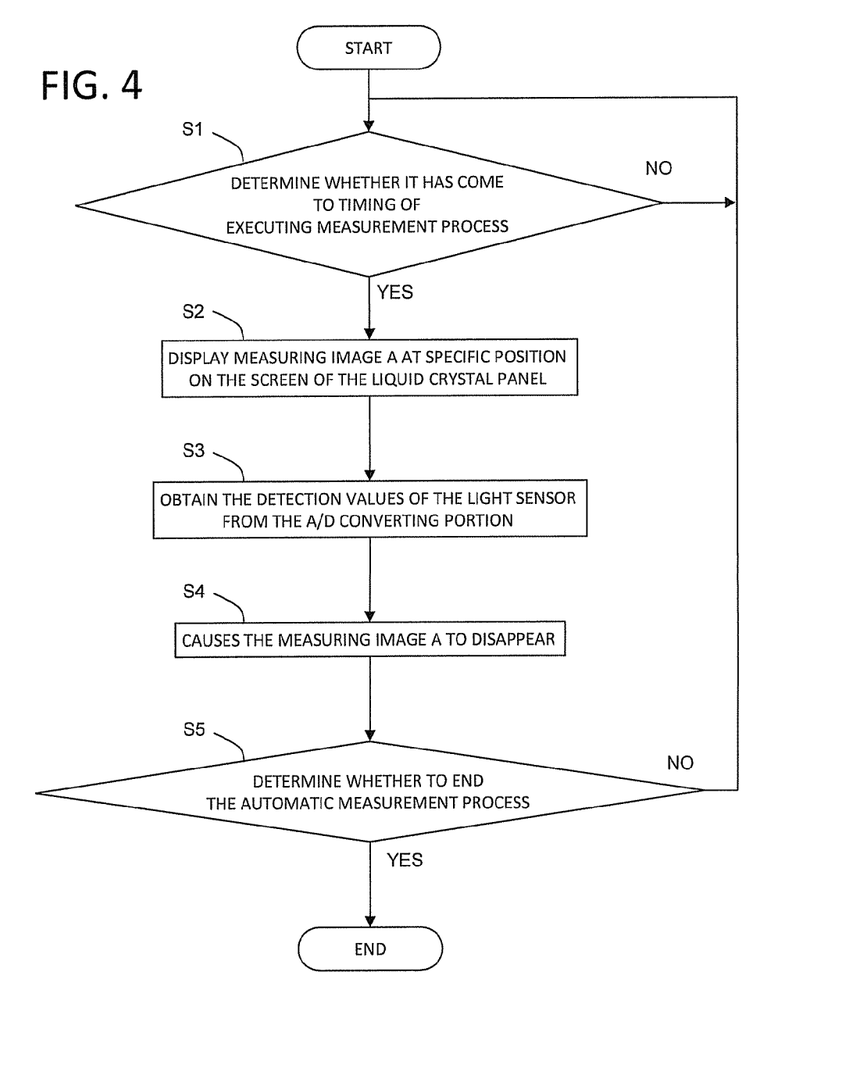
FIG. 4 is a flow chart illustrating a procedure of a measurement process executed by the display device according to the present invention.

FIG. 4 is a flow chart illustrating procedure of the measurement process executed by the display device according to the present invention, and the procedure is executed by the control unit 11 of the display device. The control unit 11 of the display device measures time, by using a timer, based on a predetermined cycle T (for example, T=10 seconds), and determines whether it has come to timing of executing the measurement process (step S1). When it has not come to the processing timing (corresponding to NO at S1), the control unit 11 stands by until it has come to the timing of executing the measurement process.

When it has come to the timing of executing the measurement process (corresponding to YES at S1), the control unit 11 gives a command to the liquid crystal drive unit 17 to display a measuring image A (see FIG. 1) at a specific position on the screen 1a of the liquid crystal panel 1 (step S2). The measuring image A is displayed only in the vicinity of the recess 2c of the framing member 2, to which the light sensor 5 is provided. In other words, the measuring image A is displayed only in a region that emits light, which is received by the light receiving surface 5a of the light sensor 5 provided within the recess 2c. The measuring image A has the tone value (for example, RGB=(255, 255, 255) and the like) necessary for the measurement.

After displaying the measuring image A, the control unit 11 of the display device obtains the detection values (measurement results) of the light sensor 5 from the A/D converting portion 18 (step S3), and causes the measuring image A to disappear (step S4), and displays images on the entirety of the screen 1a of the liquid crystal panel 1 in the original manner.

Then, the control unit 11 determines whether to end the automatic measurement process (step S5). For example, the control unit 11 determines whether the user changes the setting so as to prevent the execution of the automatic measurement process, whether the display device is turned off, whether the display device is shifted into a stand-by state, or whether the PC 99 is turned off to stop the input of image signals. When it is determined that the measurement process should not be ended (corresponding to NO at S5), the control unit 11 return the control to step S1, and repeats the above process. When it is determined that the measurement process should be ended (corresponding to YES at S5), the control unit 11 ends the measurement process.

In the display device having the above configuration, the recess 2c is formed at the framing member 2 that surrounds the screen 1a of the liquid crystal panel 1, and the light sensor 5 is formed within the recess 2c. In other words, the light sensor 5 is provided outside the screen 1a in the display device. Therefore, the user is not required to attach the light sensor 5 to the display device when executing the measurement process. Also, the light sensor 5 does not cover the screen 1a when the display characteristics are measured by using the light sensor 5. As a result, without losing the convenience of the display device, it is possible to execute the measurement process using the light sensor 5.

Also, since the light sensor 5 is provided such that the light receiving surface 5a is tilted relative to the screen 1a by a predetermined angle to face the screen 1a, outgoing light from the screen 1a of the liquid crystal panel 1 and extraneous light reflected on the screen 1a enter the light receiving surface 5a of the light sensor 5, and it is possible to prevent the extraneous light from directly entering the light receiving surface 5a of the light sensor 5. Thus, the display device is capable of detecting, by using the light sensor 5, the characteristics useful for the measurement. The display device is capable of correcting the drive amount of the liquid crystal panel 1 and the backlight 6 based on the characteristics of display device itself due to the liquid crystal panel 1 and the backlight 6 and based on the characteristics of reflected extraneous light, which may influence the display. Therefore, it is possible to improve the display quality of the display device.

Also, since the display device is configured to repeat the measurement process by the predetermined cycle T, it is possible to automatically execute the measurement process even when the user uses the display device. As a result, it is possible to reduce the labor of the user and still improve the convenience of the display device. In addition to the above, by using the measurement results, it is possible to always maintain the high quality display characteristics of the display device.

Although the liquid crystal display device having the liquid crystal panel 1 and the backlight 6 has been described as the display device in the present embodiment, the display device is not limited to the above. For example, the configuration of the present invention may be applied to another display device having another display panel (such as a PDP or an organic EL). Also, although the light sensor 5 is designed to be provided within the recess 2c of the framing member 2, the light sensor 5 is not limited to the above configuration. Alternatively, one end surface of an optical fiber, which guides light to the light sensor 5, may be provided at a position generally similar to the position of the light receiving surface 5a of the light sensor 5 shown in FIG. 2. Then, the light sensor 5 may be provided at another position, such as the inside of the casing of the display device. Also, although the light sensor 5 is configured to output the measurement results as the analog signals, the light sensor 5 is not limited to the above. The light sensor 5 may be alternatively configured to output digital signals. Also, the measuring image A, which is displayed on the liquid crystal panel 1 during the measurement process, may be any image, and it may be designed that the measuring image A may not be displayed when it is not required.

(First Modification)

Figure 5:
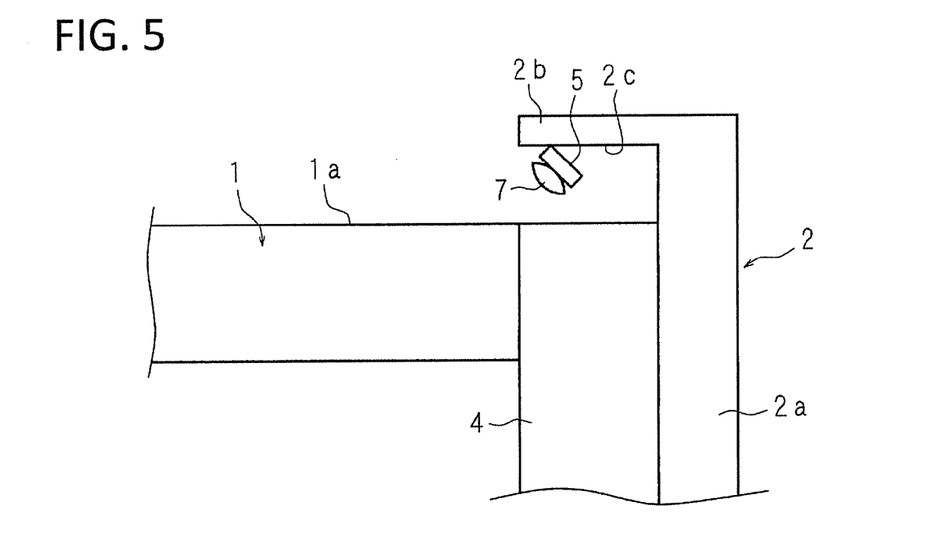
FIG. 5 is a schematic cross-sectional view illustrating a configuration of a display device according to the first modification of the first embodiment of the present invention.

FIG. 5 is a schematic cross-sectional view illustrating a configuration of a display device according to the first modification of the first embodiment of the present invention. The display device according to the first modification has a configuration, where the display device according to the first embodiment (see FIG. 2(b)) further includes a lens 7 that collects light to the light sensor 5. The lens 7 may be, for example, a convex lens having projection surfaces formed on both sides of the lens, and may be provided to face the light receiving surface 5a of the light sensor 5. The lens 7 is provided between the screen 1a of the liquid crystal panel 1 and the light receiving surface 5a of the light sensor 5. At the same time, the lens 7 is provided within the recess 2c of the framing member 2, or in other words, provided outside the screen 1a.

As above, since the lens 7 is provided between the screen 1a of the liquid crystal panel 1 and the light receiving surface 5a of the light sensor 5, it is possible to collect outgoing light from the screen 1a and extraneous light reflected on the screen 1a to the light receiving surface 5a of the light sensor 5. As a result, it is possible to improve the accuracy of measurement by the light sensor 5, and thereby it is possible to more accurately execute the calibration process of the display device. Also, since the lens 7 is provided outside the screen 1a, the lens 7 does not interfere with the image display.

(Second Modification)

Figure 6:
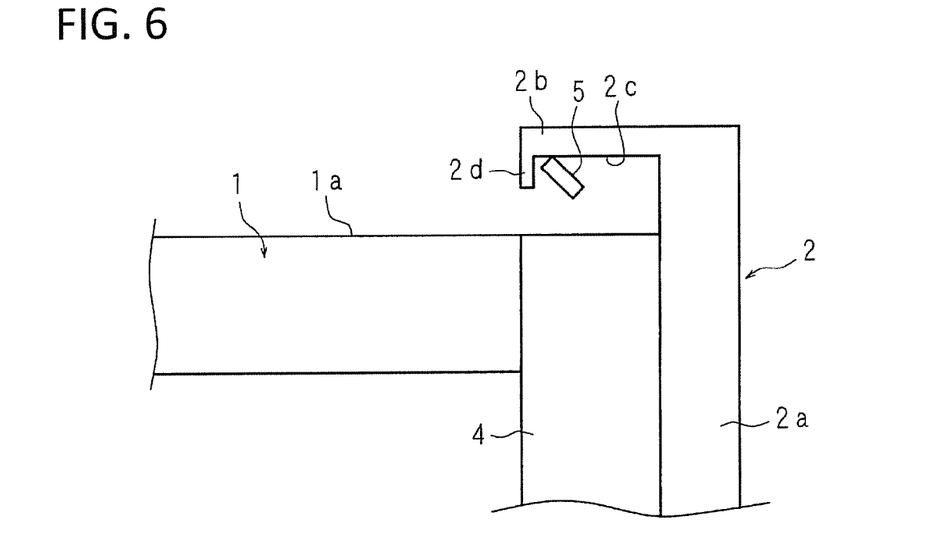
FIG. 6 is a schematic cross-sectional view illustrating a configuration of a display device according to the second modification of the first embodiment of the present invention.

FIG. 6 is a schematic cross-sectional view illustrating a configuration of a display device according to the second modification of the first embodiment of the present invention. The display device according to the second modification has a configuration, where the display device according to the first embodiment (see FIG. 2(b)) further has a light shielding portion 2d that prevents the extraneous light from directly entering the light receiving surface 5a of the light sensor 5. The light shielding portion 2d is provided integrally with the framing member 2 such that the light shielding portion 2d closes a part of the opening of the recess 2c, to which the light sensor 5 is provided.

The recess 2c has a configuration, where the inner surface and the back side of the front frame portion 2b of the framing member 2 open. Since the chassis 4 closes the back side, light enters into the recess 2c through the opening of the inner surface of the front frame portion 2b. The light shielding portion 2d is formed by causing a part of the inner edge of the opening to project from the end portion on the inner side (left side in FIG. 6) of the front frame portion 2b to the back side (lower side in FIG. 6) so as to close the forward part of the opening (the front side of the display device, or the upper side in FIG. 6), or in other words, so as to close the part of the opening, through which extraneous light directly enters thereinto. Due to the above, extraneous light from the front side of the display device is prevented by the light shielding portion 2d from entering into the recess 2c, and thereby it is possible to receive, by the light receiving surface 5a of the light sensor 5 within the recess 2c, only outgoing light from the screen 1a of the liquid crystal panel 1 and extraneous light reflected on the screen 1a.

(Third Modification)

Figure 7A:
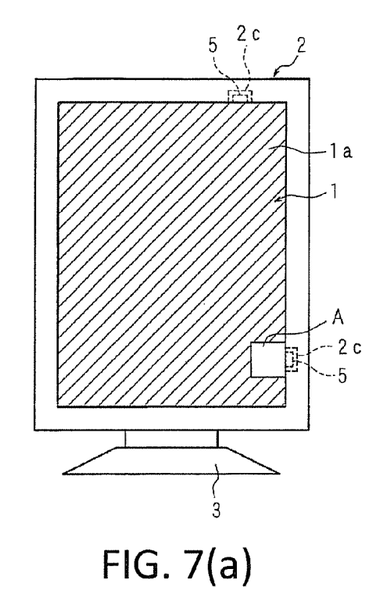
FIGS. 7(a) and 7(b) are front views illustrating appearances of a display device according to the third modification of the first embodiment of the present invention.
Figure 7B:
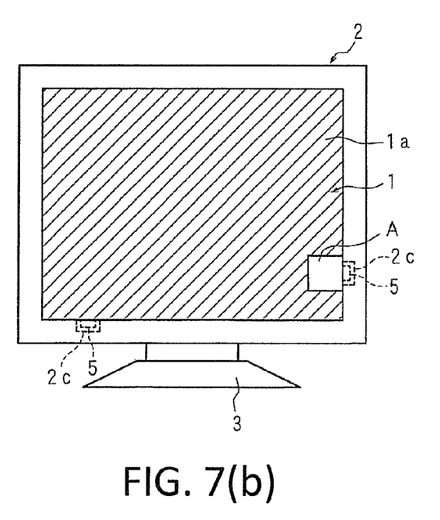

FIGS. 7(a) and 7(b) are front views illustrating appearances of a display device according to the third modification of the first embodiment of the present invention.

The above display device according to the first embodiment (see FIG. 1) has a configuration that has the single light sensor 5 mounted thereon. However, the display device is not limited to the above. Alternatively, two or more light sensors 5 may be provided to the display device. The display device according to the third modification is provided with two light sensors 5.

Also, in the display device according to the third modification, the casing (in other words, the main body part of the display device), which receives therein the liquid crystal panel 1, the backlight 6 and the like, is configured to be rotatably movably supported by the stand 3. Thus, the user is capable of switching the vertical position and horizontal position of the screen 1a by rotating the casing. More specifically, the screen 1a of the liquid crystal panel 1 has a generally rectangular shape, and thus, user is capable of changing the image display state between a vertically oriented image display state (see FIG. 7(a)) and a horizontally oriented image display state (see FIG. 7(b)). In the vertically oriented image display state, a long side of the screen 1a is directed in the vertical direction and a short side of the screen 1a is directed in the horizontal direction. In the horizontally oriented image display, the short side of the screen 1a is directed in the vertical direction, and the long side is directed in the horizontal direction.

The display device of the third modification has the recesses 2c formed at two positions on the inner surface of the framing member 2, and the light sensors 5 are provided within the recesses 2c, respectively. One of the recesses 2c is formed at a position of the framing member 2, which corresponds to the long side of the screen 1a. More specifically, the one of the recesses 2c is formed at a position that corresponds to the lower-right side of the display device in a front view when the main body part is rotated to make the display device in the vertically oriented image display state (see FIG. 7(a)). The other one of the recesses 2c is formed at another position of the framing member 2, which corresponds to the short side of the screen 1a. More specifically, the other one of the recesses 2c is formed at the position that corresponds to the lower-right side of the display device in the front view when the main body part is rotated to make the display device in the horizontally oriented image display state (see FIG. 7(b)).

The display device performs the measurement process by using only one of the two light sensors 5. During the measurement process, the display device determines the rotational position of the main body part, and measures the display characteristics by using the light sensor 5, which is located on the lower-right side of the display device in the front view. In other words, when the display device is in the vertically oriented image display state (see FIG. 7(a)), the display device displays the measuring image A in the vicinity of the recess 2c that is formed on the long-side side of the screen 1a, and uses the light sensor 5 within the recess 2c to perform the measurement process. When the display device is in the horizontally oriented image display state (see FIG. 7(b)), the display device displays the measuring image A at the vicinity of the other recess 2c that is formed on the short-side side of the screen 1a, and uses the light sensor 5 within the recess 2c to perform the measurement process.

As above, in a case of the display device that is capable of switching the vertical position and the horizontal position of the image display by rotating the main body part, multiple light sensors 5 are provided correspondingly to the long side and the short side of the screen 1a, and the display device performs the measurement process by using the corresponding light sensor 5 in accordance with the rotational position. As a result, even when the vertical position and the horizontal position of the image display are switched by the rotation, it is possible to use generally the same position (for example, the lower-right side of the display device in the front view) for the measurement using the light sensor 5, regardless of the rotational position.

Although the multiple light sensors 5 are provided to the display device that has the rotatably movable main body part, the configuration is not limited to the above. The multiple light sensors 5 may be alternatively provided to a display device having the main body part that is not rotatable. In the above case, for example, the display device performs the measurement by using the multiple light sensors 5, and computes the average value of the multiple measurement results.

(Second Embodiment)

The display device according to the first embodiment is configured to directly receive outgoing light from the screen 1a of the liquid crystal panel 1 and extraneous light reflected on the screen 1a by using the light receiving surface 5a of the light sensor 5. In contrast, in a display device according to the second embodiment, a light guiding member is provided between the screen 1a of the liquid crystal panel 1 and the light receiving surface 5a of the light sensor 5 such that the light guiding member guides, to the light receiving surface 5a of the light sensor 5, the outgoing light from the screen 1a of the liquid crystal panel 1 and the extraneous light reflected on the screen 1a.

Figure 8A:
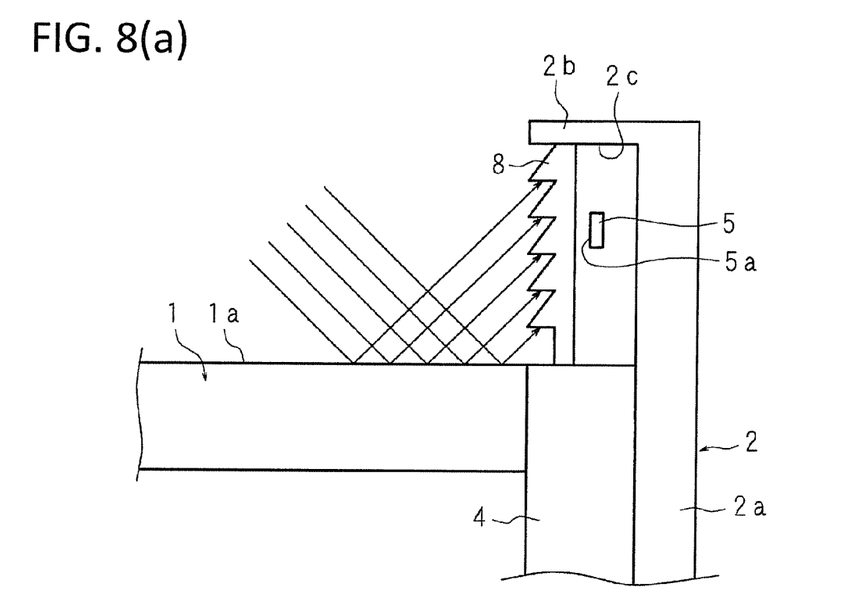
FIGS. 8(a) and 8(b) are schematic cross-sectional views illustrating configurations of a display device according to the second embodiment of the present invention.
Figure 8B:
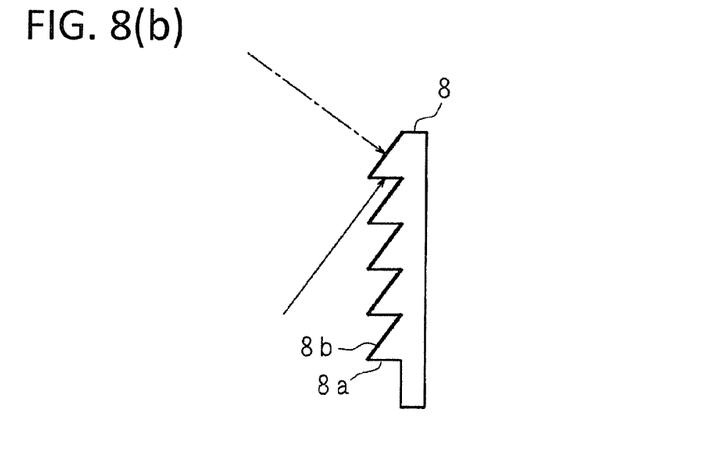

FIGS. 8(a) and 8(b) are schematic cross-sectional views illustrating the configuration of the display device according to the second embodiment of the present invention. FIG. 8(a) shows a configuration of the display device in the vicinity of the light sensor 5, and FIG. 8(b) shows a configuration of the light guiding member. Similarly to the display device according to the first embodiment, the display device according to the second embodiment has the light sensor 5 provided within the recess 2c formed at the inner surface of the framing member 2. However, the display device according to the second embodiment has a light guiding member 8 such that the light guiding member 8 closes the opening of the recess 2c, and the light sensor 5 is provided such that the light receiving surface 5a faces the light guiding member 8. Also, the light guiding member 8 is provided within the recess 2c so as to be provided outside the screen 1a of the liquid crystal panel 1.

The light guiding member 8 is an optical member having a serrated cross section. The serrated cross sectional shape has generally triangular protrusions that are regularly arranged. Also, the optical member is made of a translucent material (such as glass or transparent synthetic resin) such that the optical member allows light to transmit therethrough. More specifically, the light guiding member 8 has a plate shape that closes the opening of the recess 2c, and has one flat surface that is provided inside the recess 2c. The light guiding member 8 is provided such that the flat surface faces the light receiving surface 5a of the light sensor 5. The opposite side surface has a step shape having generally triangular elongated protrusions in a cross sectional view. The protrusions are formed to extend in the direction along the screen 1a of the liquid crystal panel 1, and the multiple protrusions are arranged in parallel with the screen 1a.

Each protrusion of the light guiding member 8 has a light collecting surface 8a on one side and a light shielding surface 8b on the other side. The light collecting surface 8a allows light to enter into the light guiding member 8 (or in other words, into the recess 2c). The light shielding surface 8b prevents light. As above, the elongated protrusions of the light guiding member 8, which have the light collecting surfaces 8a and the light shielding surfaces 8b, are arranged stepwise such that the light collecting surfaces 8a and the light shielding surfaces 8b are alternately arranged.

The light collecting surface 8a of the light guiding member 8 is provided to face the screen 1a of the liquid crystal panel 1, and is provided generally in parallel with the screen 1a. The light shielding surface 8b of light guiding member 8 is provided to face forward of the liquid crystal panel 1 (upwardly in FIG. 8(a)), and is provided to be tilted relative to the light collecting surface 8a by an acute angle (for example, 60°). The light shielding surface 8b is formed by applying a light shielding coating to, for example, the translucent light guiding member 8 such that the light shielding surface 8b prevents light from entering into the light guiding member 8.

By providing the light guiding member 8 to the opening of the recess 2c of the framing member 2, the outgoing light from the screen 1a of the liquid crystal panel 1 and the extraneous light reflected on the screen 1a are allowed to enter the light guiding member 8 through the light collecting surface 8a, which is provided in parallel with the screen 1a. Thus, it is possible to guide light to the light receiving surface 5a of the light sensor 5, which is provided within the recess 2c (see the solid line arrow in FIG. 8(b)). Also, extraneous light, which is directly applied from the exterior to the light guiding member 8, is prevented by the light shielding surface 8b, and does not enter into the light guiding member 8. Thereby, the extraneous light is not received by the light receiving surface 5a of the light sensor 5.

The display device according to the second embodiment of the above configuration has the light guiding member 8, which includes the light collecting surface 8a and the light shielding surface 8b. The light collecting surface 8a is provided to face the screen 1a of the liquid crystal panel 1, and the light shielding surface 8b is provided to face forward of the liquid crystal panel 1. The light collecting surface 8a and the light shielding surface 8b together form a step shape. As above, the light guiding member 8 is configured to guide light to the light receiving surface 5a of the light sensor 5, which is formed within the recess 2c of the framing member 2, such that it is possible to reliably guide, through the light collecting surface 8a to the light receiving surface 5a of the light sensor 5, the outgoing light from the screen 1a of the liquid crystal panel 1 and the extraneous light reflected on the screen 1a. Also, it is possible to reliably prevent the directly entering extraneous light from being measured by the light sensor 5. Also, since the limitation of the arrangement of the light sensor 5 within the recess 2c is mitigated compared with the case of the display device according to the first embodiment, it is possible to improve the flexibility in arrangement of the light sensor 5.

Although the light collecting surface 8a of the light guiding member 8 is provided to be generally in parallel with the screen 1a of the liquid crystal panel 1 in the present embodiment, the light collecting surface 8a is not limited to the above. Alternatively, the light collecting surface 8a may have another configuration provided that the light collecting surface 8a faces the screen 1a. For example, the light collecting surface 8a may be provided to be tilted relative to the screen 1a by a predetermined angle (for example, 45°). Also, although the light guiding member 8 has multiple arranged protrusions (five protrusions in FIG. 8), each of which includes the light collecting surface 8a and the light shielding surface 8b, the light guiding member 8 is not limited to the above. Alternatively, the light guiding member 8 may have only one protrusion. In other words, the light guiding member 8 may alternatively have the single light collecting surface 8a and the single light shielding surface 8b. Alternatively, the light guiding member 8 may have two to four protrusions, or have six or more protrusions.

Since the rest of the configuration of the display device according to the second embodiment is similar to the configuration of the display device according to the first embodiment, the similar components are designated by the same numerals, and the detail description thereof is omitted.

(Third Embodiment)

The above display device according to the second embodiment includes the translucent light guiding member 8 as the light guiding member that guides light to the light sensor 5. However, the light guiding member is not limited to the above. A display device according to the third embodiment includes another light guiding member that guides light to the light sensor 5 by using reflection.

Figure 9:
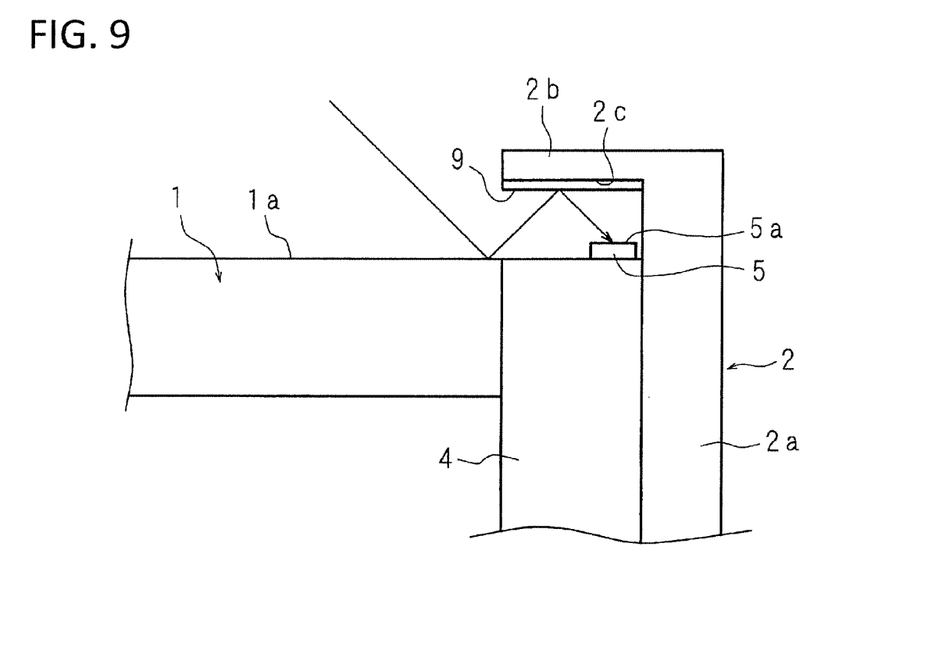
FIG. 9 is a schematic cross-sectional view illustrating a configuration of a display device according to the third embodiment of the present invention.

FIG. 9 is a schematic cross-sectional view illustrating a configuration of the display device according to the third embodiment of the present invention. The display device according to the third embodiment includes a mirror 9 that guides light to the light receiving surface 5a of the light sensor 5, which is provided within the recess 2c. In the display device according to the third embodiment, the light sensor 5 is provided within the recess 2c such that the light receiving surface 5a faces in the direction, in which the screen 1a of the liquid crystal panel 1 faces. In other words, the light receiving surface 5a faces forward of the display device. The light sensor 5 is provided into the back of the recess 2c such that extraneous light, which has directly entered into the recess 2c, is not received by the light receiving surface 5a.

The mirror 9 is provided to face the screen 1a of the liquid crystal panel 1 and the light receiving surface 5a of the light sensor 5 (or in other words, the mirror 9 is provided to face backward of the display device), and is provided to the inner surface of the recess 2c generally in parallel with the screen 1a and the light receiving surface 5a. Due to the above, extraneous light, which has directly entered into the recess 2c, is not received and reflected by the mirror 9. On the other hand, outgoing light from the screen 1a of the liquid crystal panel 1 and extraneous light reflected on the screen 10 (see the solid line arrow in FIG. 9) enter into the mirror 9 in the recess 2c, and are reflected toward the light receiving surface 5a of the light sensor 5 to be received by the light receiving surface 5a.

The display device according to the third embodiment of the above configuration has the mirror 9 within the recess 2c. The mirror 9 faces the screen 1a of the liquid crystal panel 1 and the light receiving surface 5a of the light sensor 5, and reflects light toward the light receiving surface 5a of the light sensor 5. Thus, the mirror 9 is reliably capable of guiding, toward the light receiving surface 5a of the light sensor 5, the outgoing light from the screen 1a of the liquid crystal panel 1 and the extraneous light reflected on the screen 1a.

Although the mirror 9 is provided generally in parallel with the screen 1a of the liquid crystal panel 1 and the light receiving surface 5a of the light sensor 5 in the present embodiment, the mirror 9 is not limited to the above. Alternatively, the mirror 9 may employ a mirror, a part or the whole of which is curved or bent. Also, the multiple mirrors may be employed to reflect light in multiple steps. Also, although the light sensor 5 is provided to face in the direction, in which the liquid crystal panel 1 faces, the light sensor 5 is not limited to the above. Alternatively, the light sensor 5 may be provided to face in any direction, and then the direction and the position of the mirror 9 may be accordingly adjusted based on the direction, in which the light sensor 5 is arranged. Also, the mirror 9 is not only reflecting light, but also may spread and reflect light alternatively.

Since the rest of the configuration of the display device according to the third embodiment is similar to the configuration of the display device according to the first embodiment, the similar components are designated by the same numerals, and the detail description thereof is omitted.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A display device comprising:
a display panel that displays an image; and
a light sensor provided outside a screen of the display panel so as not to cover the screen, wherein:
the light sensor is provided at a position allowing outgoing light from the screen of the display panel and extraneous light reflected on the screen to enter the light sensor, and the display device further comprises either of the features (1) or (2) below:
(1) the light sensor is provided to directly receive the outgoing light from the screen and the extraneous light reflected on the screen; or
(2) the display device further comprises light guiding means for guiding, to the light sensor, the outgoing light from the screen and the light reflected on the screen, and wherein the light guiding means is provided outside the screen of the display panel so as not to cover the screen, wherein the display device is configured to execute a correcting process so as to cancel a difference of display characteristics between ideal characteristics of the display device and a sum of the outgoing light and the extraneous light reflected on the screen.

2. The display device according to claim 1, wherein the light sensor is provided at the position preventing extraneous light from directly entering the light sensor.

3. The display device according to claim 1, further comprising:
a framing member provided to surround the display panel; and
a recess formed at an inner surface of the framing member, wherein:
the light sensor is provided within the recess.

4. The display device according to claim 3, wherein:
the light sensor has a light receiving surface that receives light; and
the light receiving surface is provided in the recess such that the light receiving surface faces the screen of the display panel in a manner, where the light receiving surface is tilted relative to the screen by a predetermined angle.

5. The display device according to claim 3, further comprising:
a light shielding means for preventing extraneous light from directly entering the recess.

6. The display device according to claim 1, wherein:
the light guiding means includes a light collecting portion and a light shielding portion, which together form a step shape;
the light collecting portion faces the screen of the display panel to receive the outgoing light from the screen and the light reflected by the screen; and
the light shielding portion faces away from the screen of the display panel to prevent extraneous light from directly entering the light sensor.

7. The display device according to claim 1, wherein:
the light guiding means is an optical member that reflects, to the light sensor, the outgoing light from the screen and the light reflected by the screen.

* * * * *